(12) United States Patent
Yang

(10) Patent No.: US 9,284,724 B2
(45) Date of Patent: Mar. 15, 2016

(54) UNIVERSAL CAPACITANCE-TYPE TOUCH INDUCTIVE SWITCH ASSEMBLY FOR FAUCET

(71) Applicant: ZHUHAI EDISON ECOTECH CORPORATION CO., LTD., Zhuhai (CN)

(72) Inventor: Yuanhong Yang, Guangzhou (CN)

(*) Notice: Subject to any disclaimer, the term of this patent is extended or adjusted under 35 U.S.C. 154(b) by 164 days.

(21) Appl. No.: 14/165,605

(22) Filed: Jan. 28, 2014

(65) Prior Publication Data
US 2015/0129060 A1 May 14, 2015

(30) Foreign Application Priority Data

Nov. 8, 2013 (CN) .......................... 2013 1 0554284
Nov. 8, 2013 (CN) .......................... 2013 2 0705640
Dec. 20, 2013 (CN) .......................... 2013 1 0711897
Dec. 20, 2013 (CN) .......................... 2013 2 0849237

(51) Int. Cl.
*E03C 1/05* (2006.01)
*F16K 31/02* (2006.01)
*F16K 11/00* (2006.01)

(52) U.S. Cl.
CPC ................ *E03C 1/055* (2013.01); *E03C 1/057* (2013.01); *F16K 19/006* (2013.01); *F16K 31/02* (2013.01); *Y10T 137/8158* (2015.04); *Y10T 137/9464* (2015.04)

(58) Field of Classification Search
CPC ....... E03C 1/057; F16K 19/006; F16K 31/02; F16K 31/05; F16K 31/055; Y10T 137/9464
USPC .............. 4/623; 251/129.03, 129.04; 137/603
See application file for complete search history.

(56) References Cited

U.S. PATENT DOCUMENTS

| | | | | |
|---|---|---|---|---|
| 4,675,949 A * | 6/1987 | DaCosta | ................ | F16L 33/14 24/20 TT |
| 5,004,373 A * | 4/1991 | Carter | .................... | B09C 1/067 299/14 |
| 5,322,086 A * | 6/1994 | Sullivan | ................... | E03C 1/052 137/601.14 |
| 5,497,808 A * | 3/1996 | Schlund | .............. | F16L 55/1683 138/97 |
| 5,694,653 A * | 12/1997 | Harald | ..................... | E03C 1/057 4/559 |
| 5,730,165 A * | 3/1998 | Philipp | ................... | E03C 1/057 137/1 |
| 6,962,168 B2 * | 11/2005 | McDaniel | ............... | E03C 1/055 137/624.11 |
| 7,625,667 B2 * | 12/2009 | Marty | ..................... | E03C 1/055 137/613 |
| 7,770,941 B2 * | 8/2010 | Ward | ..................... | F16L 21/005 285/236 |
| 8,769,777 B2 * | 7/2014 | Chang | ..................... | F16L 33/04 24/274 R |
| 2002/0166214 A1* | 11/2002 | Wachter | .................. | F16L 3/133 24/279 |
| 2013/0048090 A1* | 2/2013 | Yang | ....................... | F16K 31/02 137/1 |
| 2014/0246099 A1* | 9/2014 | Herbert | ................... | E03C 1/057 137/78.1 |

* cited by examiner

*Primary Examiner* — Matthew W Jellett

(57) ABSTRACT

The present invention relates to a universal capacitance-type touch inductive switch assembly for a faucet, comprising: an adjustable locking component, which is formed by a conductive metallic material and is locked to a faucet spout; a control circuit board, which is provided with a capacitance-type touch unit, wherein touch electrodes of said capacitance-type touch unit are connected with said adjustable locking component through a touch circuit; a solenoid valve, which is arranged in a water supply line of the faucet, wherein said control circuit board controls opening and closing of said solenoid valve according to a touch signal from the capacitance-type touch unit; and a power supply module, which supplies power to said control circuit board and said solenoid valve. The switch assembly of the present invention can be installed in a manner compatible with all existing metal faucets.

1 Claim, 9 Drawing Sheets

UNIVERSAL CAPACITANCE-TYPE TOUCH INDUCTIVE SWITCH ASSEMBLY FOR FAUCET

CROSS-REFERENCE TO RELATED APPLICATIONS

This application claims the priority benefit of Chinese application no. 2013107118974, which was filed on Dec. 20, 2013, Chinese application no. 2013208492378, which was filed on Dec. 20, 2013, Chinese application no. 2013105542844, which was filed on Nov. 8, 2013 and Chinese application no. 2013207056403, which was filed on Nov. 8, 2013. The entirety of the above-mentioned patent application is hereby incorporated by reference herein and made a part of specification.

BACKGROUND OF THE INVENTION

1. Field of the Invention

The present invention relates to the field of automatic control, and particularly to a universal capacitance-type touch inductive switch assembly for a faucet. This switch assembly is a DIY means which controls water supply by means of body induction touch, and particularly to a DIY control box which controls water supply by means of body capacitance induction touch. The DIY control box can be connected to all existing faucets in a modular fashion to realize the functions of a capacitance-type touch faucet.

2. Background of the Invention

The faucets commonly comprise top screwing switch type faucets and lifting handle type faucets. Among faucets for use in the kitchen, lifting handle type faucets are applied more commonly. The reason is that in the kitchen the faucets are used more frequently, and this kind of faucet is more convenient in operation.

The lifting handle type faucets generally operate in the following manner. A switch valve and a water mixer are integrated in the lifting handle. If the handle is lifted upward, the switch valve is opened so that the faucet supplies water. If the handle is pressed downward, the switch valve is opened so that the faucet stops supplying water. When the handle is rotated to the left or right, water is mixed at outlets of a cold water line and a hot water line which supply water to the faucet, so that the temperature of water is adjusted.

During use of such a faucet, it is not convenient to operate the handle if the user has his hands with oil or liquid detergent, since the handle of faucet would be stained. If the user holds anything in his hands, it is not convenient for him to adjust the handle switch. In addition, since the handle switch is a pure mechanical structure, the problem of mechanical wear occurs if it is switched frequently. After use for a long period, the faucet may not be closed properly or water may be leaked from it.

To this end, U.S. Pat. No. 6,962,168B2 discloses a capacitance induction faucet. A capacitance induction module is arranged in the faucet, the spout of the metal faucet acts as an electrode of the capacitor, and the human body acts as the other electrode of the capacitor. When the body touches the metal faucet spout, it constitutes the capacitor with the metal faucet spout. This induction capacitance is generally several pF to dozens of pF. The weak high-frequency current produced by the capacitance induction module flows to the ground through the body. When the capacitance induction module detects such a weak current, the action that the body made a touch is determined. Such a touch can be a touch by an arm, instead of moving the handle with a hand, so that the convenience of use is enhanced. In the technical solution as disclosed in U.S. Pat. No. 6,962,168B2, a solenoid valve is connected in series at a site downstream the water mixing valve in the water supply line. When the controller detects a touch, it sends a pulse signal for controlling opening and closing of the solenoid valve. During use, the mechanical switch to which the handle is connected is opened firstly. In a state the mechanical switch is opened, the opening and closing of water supply is realized by the touch faucet spout.

This faucet is of an integral type. In order to put it into use, the faucet at home should be replaced, which brings about waste and inconvenience. In case that the size of installing holes for new faucet is different from that the original faucet, it is required to drill new installing holes by means of a special drilling tool, which make it very difficult to install the faucet. Therefore, there is an urgent need for an assembly which is applicable to all existing or on-sale metal faucets, and can also realize the touch inductive switch operation.

BRIEF SUMMARY OF THE INVENTION

It is an object of the present invention to overcome drawbacks in the prior art, and to provide a touch control module which are applicable to all metal faucets.

It is another object of the present invention to provide a control module which selectively supplies warm water or cold water according to times of touch.

It is a further object of the present invention to provide a control module which enables a user to correctly determine the current states of water valves of a faucet by means of an audible alarm means.

In order to realize the above and other objects of the present invention, the present invention has adopted the following technical solutions.

A universal capacitance-type touch inductive switch assembly for a faucet comprises: an adjustable locking component, which is formed by a conductive metallic material and is locked to a faucet spout; a control circuit board, which is provided with a capacitance-type touch unit, wherein touch electrodes of said capacitance-type touch unit are connected with said adjustable locking component through a touch circuit; a solenoid valve, which is arranged in a water supply line of the faucet, wherein said control circuit board controls opening and closing of said solenoid valve according to a touch signal from the capacitance-type touch unit; and a power supply module, which supplies power to said control circuit board and said solenoid valve.

Preferably, in said universal capacitance-type touch inductive switch assembly for a faucet, said adjustable locking component is a locking buckle, wherein the locking buckle is divided into two half-ring shaped components which are buckled with each other, and said two half-ring shaped components are tightened by screws and buckled to a portion of said faucet spout below the top.

Preferably, in said universal capacitance-type touch inductive switch assembly for a faucet, said adjustable locking component comprises:

a metallic lock belt, which has an open annular shape, wherein both ends of said metallic lock belt are arranged at the opening of the open annular shape, an outer circumferential surface for one of the ends is sleeved by a slidable plate, and an outer circumferential surface of said metallic lock belt is provided with oblique threads;

a sleeve, which is provided with female threads and is fastened to said slidable plate;

a rotary screw, one end of which engages with female threads of said sleeve, and the other end of which engages with oblique threads on the outer circumferential surface of the said metallic lock belt.

Preferably, in said universal capacitance-type touch inductive switch assembly for a faucet, both said control circuit board and said solenoid valve are arranged in a waterproof control box, an upper cover of said waterproof control box is provided with a sliding cover, and the sliding cover is slid to expose a time delay select switch which adjusts the setting of effective touch duration by the control circuit board, a function select switch which adjusts the setting of whether the control of the solenoid valve is enable by the control circuit board, and a reset switch which adjusts the control circuit board to the original setting value.

According to another solution of the present invention, the present invention further discloses a universal capacitance-type touch inductive switch assembly for a faucet, comprising:

an induction component, which is formed by a conductive metallic material;

a control circuit board, which is provided with a capacitance-type touch unit, wherein touch electrodes of said capacitance-type touch unit are connected with said induction component through a touch circuit;

a solenoid valve, which is arranged in a water supply line of the faucet, wherein said control circuit board controls opening and closing of said solenoid valve according to a touch signal from the capacitance-type touch unit;

a power supply module, which supplies power to said control circuit board and said solenoid valve; and an electric quantity detect module, which detects the electric energy of the power supply, and notifies the control circuit board to keep the solenoid valve in an opened state, when the electric energy is lower than a predetermined value.

Preferably, in said universal capacitance-type touch inductive switch assembly for a faucet, said control circuit board is further provided with a time delay select unit, for selecting a touch duration which activates opening or closing of the solenoid valve.

Preferably, in said universal capacitance-type touch inductive switch assembly for a faucet, said control circuit board is further provided with a buzzer unit, wherein if the touch duration exceeds a time delay which is selected by the time delay select unit, the buzzer makes a sound which indicates the touch is an effective touch, and the control circuit board opens or closes the solenoid valve.

Preferably, in said universal capacitance-type touch inductive switch assembly for a faucet, said induction component contacts with the faucet spout through conductive adhesion, snap connection or threaded connection, or said induction component is spaced apart from the faucet spout by a gap, so that a capacitor is formed between said induction component and the faucet spout for passing through a high-frequency current.

Preferably, in said universal capacitance-type touch inductive switch assembly for a faucet, said control circuit board further comprises an amplifier circuit, which amplifies said high-frequency current by a factor of 80-150, so that a body approach the faucet spout, a body capacitance induction occurs.

According to a further solution of the present invention, the present invention further discloses a universal capacitance-type touch inductive switch assembly for a faucet, comprising:

an induction component, which is formed by a conductive metallic material;

a control circuit board, which is provided with a capacitance-type touch unit, wherein touch electrodes of said capacitance-type touch unit are connected with said induction component through a touch circuit;

a cold water solenoid valve and a hot water solenoid valve, which are arranged in a cold water feed line and a hot water feed line respectively, wherein said cold water feed line and hot water feed line are both arranged upstream with respect to a water mixing valve in the water supply line of the faucet, and said control circuit board controls opening and closing of said cold water solenoid valve and said hot water solenoid valve according to a touch signal from the capacitance-type touch unit; and a power supply module, which supplies power to said control circuit board and said solenoid valves.

Preferably, in said universal capacitance-type touch inductive switch assembly for a faucet, said control circuit board, said cold water solenoid valve and said hot water solenoid valve are all arranged in a waterproof control box, an inlet pipe and an outlet pipe of said cold water solenoid valve as well as an inlet pipe and an outlet pipe of said hot water solenoid valve extend from said waterproof control box, and said touch circuit also extends from said control box.

Preferably, in said universal capacitance-type touch inductive switch assembly for a faucet, said induction component contacts with the faucet spout through conductive adhesion, snap connection or threaded connection, or said induction component is spaced apart from the faucet spout by a gap, so that a capacitor is formed between said induction component and the faucet spout for passing through a high-frequency current.

Preferably, in said universal capacitance-type touch inductive switch assembly for a faucet, in case said hot water solenoid valve and said cold water solenoid valve are both closed, a touch is an effective touch if its duration exceeds a time delay which is selected by a time delay select unit, and if a continuous time elapses after the end of the effective touch during which there is no effective touch, said control circuit board opens both the hot water solenoid valve and cold water solenoid valve.

Preferably, in said universal capacitance-type touch inductive switch assembly for a faucet, if a second effective touch occurs in a continuous time after a first effective touch, then these two effective touches form a continuous effective touch, and if the times of continuous effective touch are two or more, said control circuit board closes the hot water solenoid valve and only opens the cold water solenoid valve.

Preferably, in said universal capacitance-type touch inductive switch assembly for a faucet, said waterproof control box is further provided with a LED indicator, which is connected with said control circuit board, wherein when said control circuit board detects an effective touch, the indicator is lighted up, and/or;

said control circuit board is provided with a buzzer, wherein when said control circuit board detects an effective touch, said buzzer gives an alarm.

According to the present invention, the universal capacitance-type touch inductive switch assembly for a faucet can be installed to all existing or market available metal faucets so that the faucet can realize functions of capacitance touch switch. Besides, the faucet is provided with multiple control modes to enhance experience and convenience for the user.

DETAILED DESCRIPTION OF THE INVENTION

In the following preferred embodiments of the invention will be described, by way of example only, and with reference to the drawings, so as to elucidate the technical solutions of the present invention more clearly.

In view of the drawbacks in the prior art, the present invention provides a DIY control means which inductively controls water supply by means of body induction capacitance touch, and which is universal, is easy to install, and does not require remove the original faucet.

Figure 1:
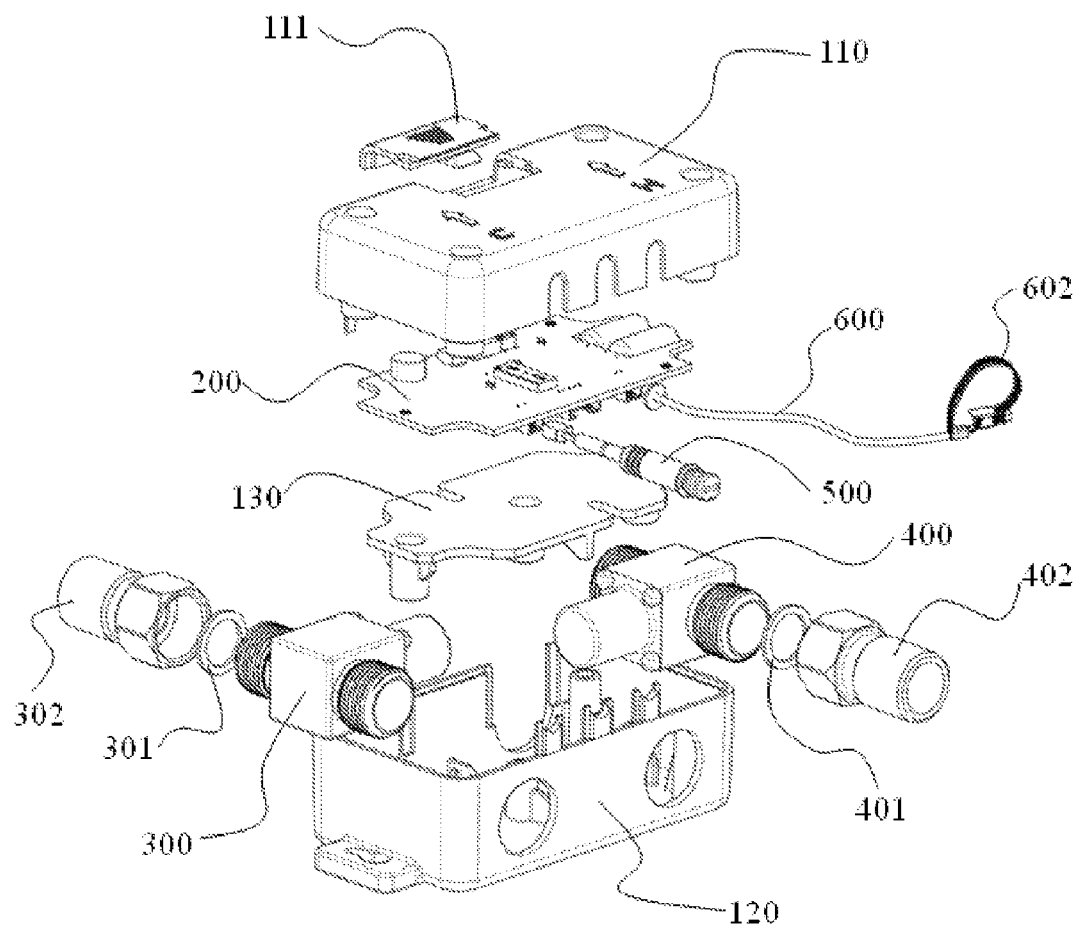
FIG. 1 is an exploded view showing a control box and internal components thereof of the present invention.

According to the present invention, as shown in FIG. 1, the universal capacitance-type touch inductive switch assembly for a faucet comprises: an adjustable locking component 602, which is formed by a conductive metallic material and is locked to faucet spout. The spout of faucet is generally a hollow elbow, comprising an upper end which is connected with a water outlet and a lower end which is a water inlet. The water inlet is provided with male threads at an end thereof, and is always a copper member. The adjustable locking component 602 can be connected with the lower end of the faucet spout, and locked to the male threads at the end of the water outlet. The adjustable locking component 602 is required to be able to install to different faucets. In order to fit faucet spouts of different diameters, the adjustable locking component 602 has an inner diameter which can be adjusted so that it is compatible with faucet spouts of any size. A control circuit board 200 is provided with a capacitance-type touch unit. Touch electrodes of the capacitance-type touch unit are connected with the adjustable locking component 602 through a touch circuit 600. In this way, the touch electrodes are extended outward and up to the metal faucet. To make it convenient for touching, the touch electrodes are generally extended to the faucet spout. Thus, the touch between the human body and the faucet spout can develop a body induction capacitor, which further yields a high-frequency current. According to whether there is a touch, the control circuit board 200 decides to issue a pulse signal to start or close a solenoid valve 300 (400). The solenoid valve 300 is arranged in a water supply line of the faucet. The solenoid valve 300 can be arranged either ahead of or behind a water mixing valve, and is connected in series with a pure mechanical waterway switch at the handle. That is, only when the mechanical switch at the handle is in the opened state, the solenoid valve 300 is opened so that the faucet can supply water. Similarly, even the mechanical switch at the handle is in the opened state, the solenoid valve 300 is closed so that the faucet cannot supply water. In this way, the user can touch the faucet spout with his arm, so that the flowing water can be closed. The control circuit board 200 controls opening and closing of the solenoid valve 300 (400) according to a touch signal from the capacitance-type touch unit. In this solution, a power supply module is further needed for supplying power to the control circuit board and the solenoid valve. The power supply module can be either a battery, or a power supply which outputs DC 6V from the mains supply by a transformer. The power supply module is subject to small power consumption, since it only supplies power to the control circuit board. That is, both a battery module and an external power supply module are applicable in the present invention.

The adjustable locking component 602 can be a locking buckle. The locking buckle is divided into two half-ring shaped components which are buckled with each other. Said two half-ring shaped components are tightened by screws and buckled to a portion of said faucet spout below the top. In case of faucet spouts with different diameters, the adjustable locking component 602 can be adapted to various faucet spouts by adjusting the screwing distance of screws. In case the faucet spout has a shape other than circular, the adjustable locking component 602 can also be applied. The adjustable locking component 602 can closely fit to the faucet spout. The adjustable locking component 602 can also be spaced apart from the faucet spout by a distance, provided that the distance is small enough. The distance is so small that the delivery of the high-frequency current is not affected. That is, in case of such a distance, a coupling capacitor is developed between the adjustable locking component 602 and the faucet spout. The high-frequency current can be delivered to the faucet spout by penetrating through the coupling capacitor, then penetrate through the body induction capacitor, and finally flow to the ground via the body. Such a circuit is always connected. Therefore, even the body does not contact the faucet spout completely, and a gap is left between them, the high-frequency current can still penetrate through the body induction capacitor. The high-frequency induction current is weaker in this case. Therefore, an amplifier circuit can be arranged on the control circuit board to amplify the high-frequency current. In case that the magnification factor is large enough (generally ~100), the proximity induction can be realized. That is, it is not necessary for the body to touch the faucet spout. Proximity to a certain distance will trigger the control circuit board to send a pulse signal for controlling the solenoid valve.

Figure 4:
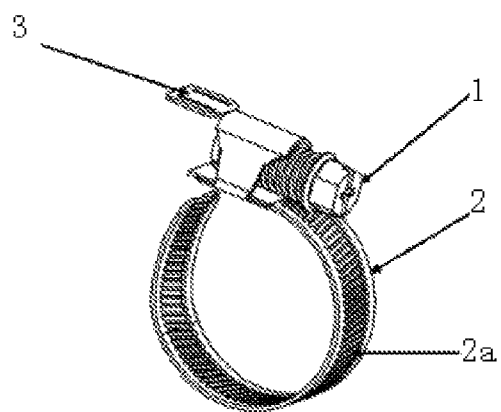
FIG. 4 is an enlarged view showing an adjustable locking component in FIG. 1.

More preferably, the adjustable locking component 602 can adopt the following structure. As shown in FIG. 4, it comprises a metallic lock belt 2, which has an open annular shape. Both ends of the metallic lock belt 2 are located at the opening. An outer circumferential surface for one of the ends is sleeved by a slidable plate, and an outer circumferential surface of said metallic lock belt is provided with oblique threads 2a. Both sides of the slidable plate are bent downward, so that said slidable plate is sleeved onto the metallic lock belt 2, and the metallic lock belt 2 can slide with respect to the slidable plate. The slidable plate can also be a flat nesting plate, so that the metallic lock belt 2 can pass through the flat nesting plate and can slide with respect to the slidable plate. The adjustable locking component 602 further comprises a sleeve with female threads. Said sleeve is fastened to said slidable plate. The sleeve is used to restrict a rotary screw. One end of the rotary screw engages with female threads of said sleeve, and the other end engages with oblique threads on the outer circumferential surface of said metallic lock belt 2. During rotation of the rotary screw 1, except for the rotating movement with respect to the sleeve, it usually does not move axially with respect to the sleeve. However, since the other end of it engages with the oblique threads 2a, the oblique threads 2a are driven by threads on the rotary screw 1 so as to move along the axis of the rotary screw. In this manner, the diameter of the ring surrounded by the metallic lock belt 2 can be increased or decreased, so that the diameter fits to that of the faucet spout. By screwing the rotary screw 1 in two different directions, the diameter of the ring surrounded by the metallic lock belt 2 can be increased or decreased. For aesthetic reasons, the metallic lock belt 2 is generally connected to a portion of the faucet spout below the top, so that the connected point can be hidden. The top can be a pool top. Of course, the metallic lock belt 2 can be connected at any portion of the faucet spout.

Figure 2:
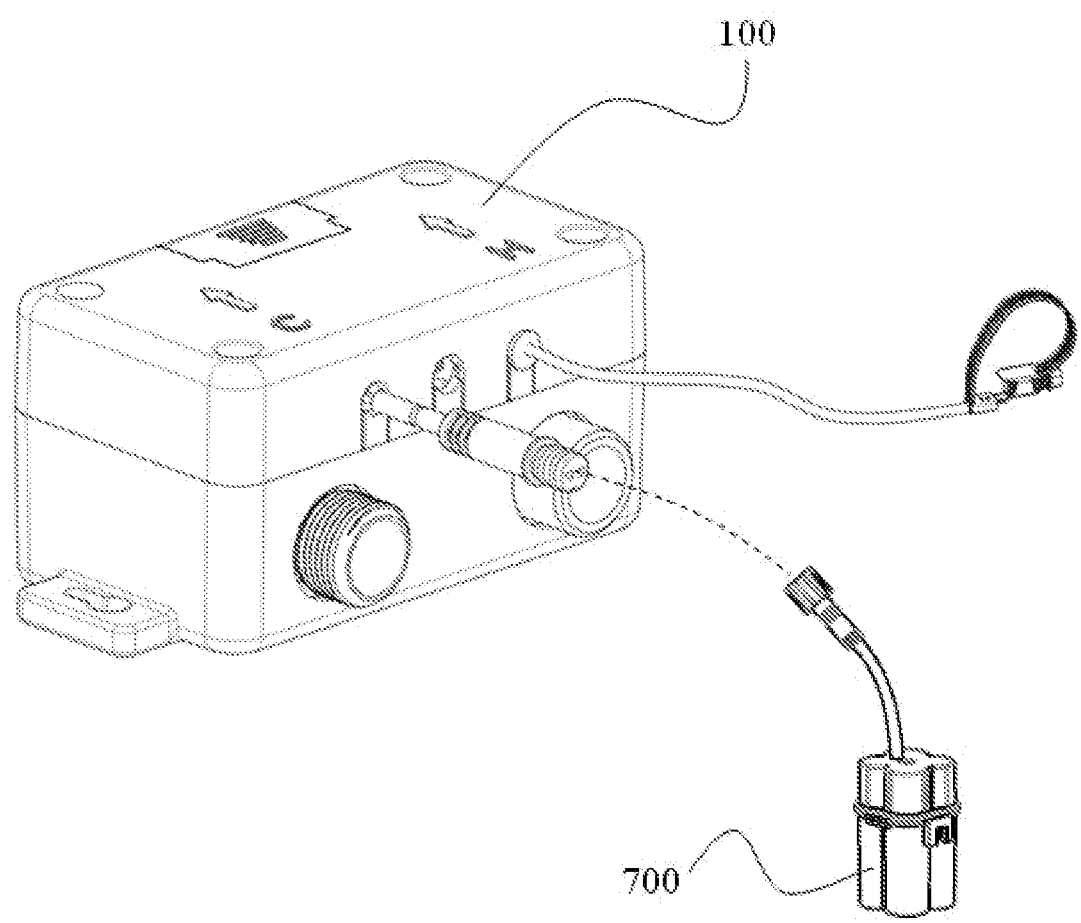
FIG. 2 is a schematic overall appearance showing the control box of the present invention.

As shown in FIGS. 1 and 2, both said control circuit board 200 and said solenoid valve 300 (400) are arranged in a waterproof control box. An upper cover of said waterproof control box is provided with a sliding cover 111. The sliding cover 111 can be slid away to reveal a time delay select switch, a function select switch, and a reset switch. After sliding away the sliding cover, the user can manually operate these switches, to set the time delay select switch, the function select switch and the reset switch according to his habit. The time delay select switch adjusts the setting of an effective touch duration by control circuit board 200. In the present invention, if the touch duration is too short, it is not determined as an effective touch but an accidental touch. Only when the touch duration exceeds a certain threshold, the touch is determined as an effective touch. The time delay can be set by the user itself. For example, it is set that only the touch duration exceeds 60 ms, the touch is determined as an effective touch. There is no upper limit for the touch duration. All touches with touch duration over 60 ms are determined as effective touches. The function select switch adjusts the setting of whether the control of the solenoid valve by the control circuit board is activated. If the user temporarily does not want to use the solenoid valve switch faucet, he can use the function select switch to close the capacitance-type touch control function. Namely, the solenoid valve is always in the opened state, regardless of the touch to faucet spout. If the function of the solenoid valve fails, the reset switch can be used to adjust the control circuit board to the original setting value or the default setting value.

In a technical solution, the universal capacitance-type touch inductive switch assembly for a faucet comprises: an induction component, which is formed by a conductive metallic material. The induction component may have any shape, and is not limited to the above ring shape. For example, the induction component may be in the form of a patch, which can be attached to or approach the faucet spout. The universal capacitance-type touch inductive switch assembly for a faucet further comprises a control circuit board 200, which is provided with a capacitance-type touch unit. Touch electrodes of the capacitance-type touch unit are connected with said induction component through a touch circuit 600. A solenoid valve 300 (400) is arranged in a water supply line of the faucet. Both ends of the solenoid valve 300 (400) are provided with a water pipe. During installation, it is only necessary for the user to connect water pipes at both ends of the solenoid valve to the existing feed line. The control circuit board 200 controls opening and closing of said solenoid valve according to a touch signal from the capacitance-type touch unit. Generally, upon receiving an effective touch, the control circuit board 200 sends a pulse signal to the solenoid valve, so that the solenoid valve changes its current state. For example, if the current state is an opened state, it is switched to a closed state; while if the current state is the closed state, it is switched to the opened state. A power supply module supplies power to said control circuit board and said solenoid valve. The power supply module can be either a battery, or a power supply which outputs DC 6V from the mains supply by a transformer. An electric quantity detect module detects electric energy of the power supply. When the electric energy is lower than a predetermined value, the electric quantity detect module notifies the control circuit board to control solenoid valve 300 so as to keep open. This aims to prevent the situation in which the solenoid valve cannot be opened due to a low electric quantity in the battery. During use, the solenoid valve can also be opened via the reset switch, so as to void that the water cannot flow out of the faucet.

Said control circuit board 200 is further provided with a time delay select unit for selecting a touch duration which activates opening or closing of the solenoid valve. For example, the setting value can set to 40 ms, 60 ms, or 100 ms. Only when the touch duration of a touch exceeds this setting value, the touch can be determined as an effective touch, and then causes the control circuit board 200 to send a pulse signal to the solenoid valve.

Said control circuit board is further provided with a buzzer unit. If the touch duration exceeds a time delay which is selected by the time delay select unit, the buzzer makes a sound which indicates the touch is an effective touch, and the control circuit board opens or closes the solenoid valve. The buzzer functions to have an indicating effect, so that the user can know the current operating state of the universal capacitance-type touch inductive switch assembly for a faucet.

Said induction component contacts with the faucet spout through conductive adhesion, snap connection or threaded connection. Or, said induction component is spaced apart from the faucet spout by a gap, so that a capacitor is formed between said induction component and the faucet spout for passing through a high-frequency current.

Said control circuit board further comprises an amplifier circuit. The amplifier circuit amplifies said high-frequency current by a factor of 80-150, so that upon the body is approaching the faucet spout, a body capacitance induction occurs. With such an amplifier circuit, the induction can occur when the body is approaching. At this time, the induction component does not contact the faucet spout, but is spaced apart from the latter. Even in this case, the high-frequency current can also be passed.

In a technical solution, the universal capacitance-type touch inductive switch assembly for a faucet comprises: an induction component, which is formed by a conductive metallic material; a control circuit board, which is provided with a capacitance-type touch unit, wherein touch electrodes of said capacitance-type touch unit are connected with said induction component through a touch circuit; a cold water solenoid valve 300 and a hot water solenoid valve 400, which are arranged in a cold water feed line and a hot water feed line respectively, wherein said cold water feed line and hot water feed line are both arranged upstream with respect to a water mixing valve in the water supply line of the faucet. In this solution, the cold water feed line and the hot water feed line are provided with a solenoid valve respectively. Thus, it is possible to realize multiple modes for water supply, and the water is supplied in a more flexible manner. The cold water passes the cold water solenoid valve 300 and then enters a water mixing means, and this is also the case for the hot water. Warm water is provided after water mixing for the user to use.

Said control circuit board controls opening and closing of said cold water solenoid valve and said hot water solenoid valve according to a touch signal from the capacitance-type touch unit. The universal capacitance-type touch inductive switch assembly for a faucet further comprises a power supply module, which supplies power to said control circuit board and said solenoid valves.

Said control circuit board 200, said cold water solenoid valve 300, and said hot water solenoid valve 400 are all arranged in a waterproof control box, an inlet pipe and an outlet pipe of said cold water solenoid valve 300 as well as an inlet pipe and an outlet pipe of said hot water solenoid valve 400 extend from said waterproof control box, and said touch circuit 600 also extends from said control box. The control box is sealed and waterproof to prevent splashing water from entering the control circuit board and thus causing damage.

Said induction component contacts with the faucet spout through conductive adhesion, snap connection or threaded connection. Or said induction component is spaced apart from the faucet spout by a gap, so that a capacitor is formed between said induction component and the faucet spout for passing through a high-frequency current.

In case said hot water solenoid valve and said cold water solenoid valve are both closed, a touch is an effective touch if its duration exceeds a time delay which is selected by a time delay select unit, and if a continuous time elapses after the end of the effective touch during which there is no effective touch, said control circuit board opens both the hot water solenoid valve and cold water solenoid valve. For example, the time delay is set to 30 ms, and the continuous time is further set to 65 ms. In case an effective touch over 30 ms is detected, the control circuit board 200 does not immediately sends a pulse signal at the end of the touch, but waits for a continuous time of 65 ms. If there is no touch event in the continuous time of 65 ms, the controller determines that there is only one touch, instead of a continuous touch. At this time, both the hot water solenoid valve and the cold water solenoid valve are opened. In case any one of the hot water solenoid valve and the cold water solenoid valve is opened, when the controller receives a touch signal, both the hot water solenoid valve and the cold water solenoid valve can be closed immediately without waiting for a continuous time of 65 ms. The reason lies in that in case any one of the hot water solenoid valve and the cold water solenoid valve is opened, a further touch only conveys the information of closing.

If a second effective touch occurs in a continuous time after a first effective touch, these two effective touches form a continuous effective touch. If the times of continuous effective touch are two or more, said control circuit board closes the hot water solenoid valve and only opens the cold water solenoid valve. If a second touch occurs in a continuous time of e.g. 65 ms, and if the second touch is also an effective touch, the second touch and the first effective touch are combined to form a continuous touch. When the times of continuous touch exceed twice (e.g., three, four or more times), the controller controls the faucet to only supply cold water. If the universal capacitance-type touch inductive switch assembly for a faucet of the present invention is applied as a faucet in kitchen, the kitchen water should be cold water in some cases. This is the case for e.g. water for stewing or water for washing rice. Therefore, in these cases, the function of supplying cold water by a continuous touch has its practical value.

If a second effective touch occurs in a continuous time after a first effective touch, these two effective touches form a continuous effective touch. If the times of continuous effective touch are two or more, said control circuit board closes the hot water solenoid valve and only opens the cold water solenoid valve.

The control box is further provided with a LED indicator, which is connected with said control circuit board. When said control circuit board detects an effective touch, the indicator is lighted up. In this case, the control box is installed at a notable position on the top, and only the touch circuit is hidden below the top to be connected with the faucet spout.

Said control circuit board is provided with a buzzer. When said control circuit board detects an effective touch, said buzzer gives an alarm. In this case, the control box can also be installed below the top, and an effective touch is determined by sound.

The present invention provides a DIY control box, which may be available in market in the form of a switch assembly. It can be installed to the existing faucet by the user, or assembled to a faucet bought by the user. The solenoid valve assembly can be a pulse solenoid valve.

The control circuit board 200 comprises a touch unit, a MCU control unit, a time delay select switch, a voltage detect unit, a solenoid valve drive unit, a buzzer unit, and an indicator unit. The touch unit chip can adopt TS01S. The MCU control unit chip can adopt MCU SN8P2612S available from SONIX. The time delay select switch can be a horizontal type rotary switch, and 10 types of delay times from level 0 to level 9 can be selected as needed. The voltage detect module chip can adopt HT7039A available from HOLTEK. The buzzer unit can be an electromagnetic buzzer.

The power supply module provides DC 6V to the whole system. The power supply module is connected with the control circuit board through a power supply line. An end of the power supply line is provided with a 2-Pin waterproof connector. The waterproof connector not only can be connected with an output end of an external transformer, but also an output end of a waterproof battery box.

The control box can be made from ABS plastic. The control box consists of an upper cover 110, a lower cover 120, and a covering plate 130. The covering plate 130 is mainly used for fixing the solenoid valve 300 (400) (which is installed in the control box) with three screws. The upper cover 110 is provided with a sliding cover 111. The sliding cover 111 can be slid away to reveal a time delay select switch, a function select switch, and a reset switch. The control box as a whole is fixed with four screws. The screw holes are sealed with a soft rubber to facilitate waterproof protection. The directions for water inlet and outlet are indicated by arrows on the control box. The letter "C" indicates cold water, while "H" indicates hot water.

The control box of the present invention is compact in structure. It can be installed below the faucet without affecting the arrangement of the inlet and outlet pipes. Besides, the water inlet and outlet of the control box adopt a universal G1/2 connector, and can be installed conveniently and quickly. The control box can be supplied by a battery or a DC 6V output by a transformer, so that both the battery and an external power supply are applicable. When the battery is out of power, the solenoid valve operates in the opened state. In case the battery is out of power, only the touch control function fails, and the faucet operates as the existing common faucet. The control circuit adopts a chip which has ultra-low power consumption. When not use, the chip usually enters a sleeping mode, so that the stand-by power consumption of the control circuit is even lower and the battery has a longer lifetime.

Referring to FIGS. 1 and 2 again, the switch assembly of the present invention comprises a control box 100, a control circuit board 200, a cold water solenoid valve assembly 300, a hot water solenoid valve assembly 400, a power supply line 500, a touch circuit 600, and a battery box 700.

Said control box 100 comprises an upper cover 110, a lower cover 120, and a solenoid valve covering plate 130. The covering plate is formed by a material like ABS plastic. The upper cover is provided with a sliding cover 111. By sliding away the sliding cover, the time delay select switch, the function select switch, and the reset switch on the circuit board can be see, so that it is convenient for regulation and control.

Said control circuit board 200 comprises a time delay select switch, a function select switch, a reset switch, an electromagnetic buzzer.

Said cold water solenoid valve assembly comprises a cold water solenoid valve 300, a waterproof O-shaped gasket 301, and a connection pipe fitting 302. The connection pipe fitting 302 is connected with the solenoid valve 300 via nuts.

Said hot water solenoid valve assembly comprises a hot water solenoid valve 400, a waterproof O-shaped gasket 401, and a connection pipe fitting 402. The connection pipe fitting 402 is connected with the solenoid valve 400 via nuts.

Said power supply line 500 comprises a 2-Pin cable with a waterproof connector. The waterproof connector can be connected with the output end of the battery box 700 or the external power supply transformer.

Said touch circuit comprises a touch circuit 600, and a buckle 602 with locking nuts. The inner diameter of the buckle 602 can be adjusted to fit the fixing screws for faucets with different sizes, so that a reliable connection can be realized.

Said battery box 700 can be filled with 4 AA batteries. An output end of the battery box is provided with a waterproof connector, which can be connected directly with a power supply input line 500 of the control box.

The operating principle and function of the circuit control is explained as follow.

Figure 3:
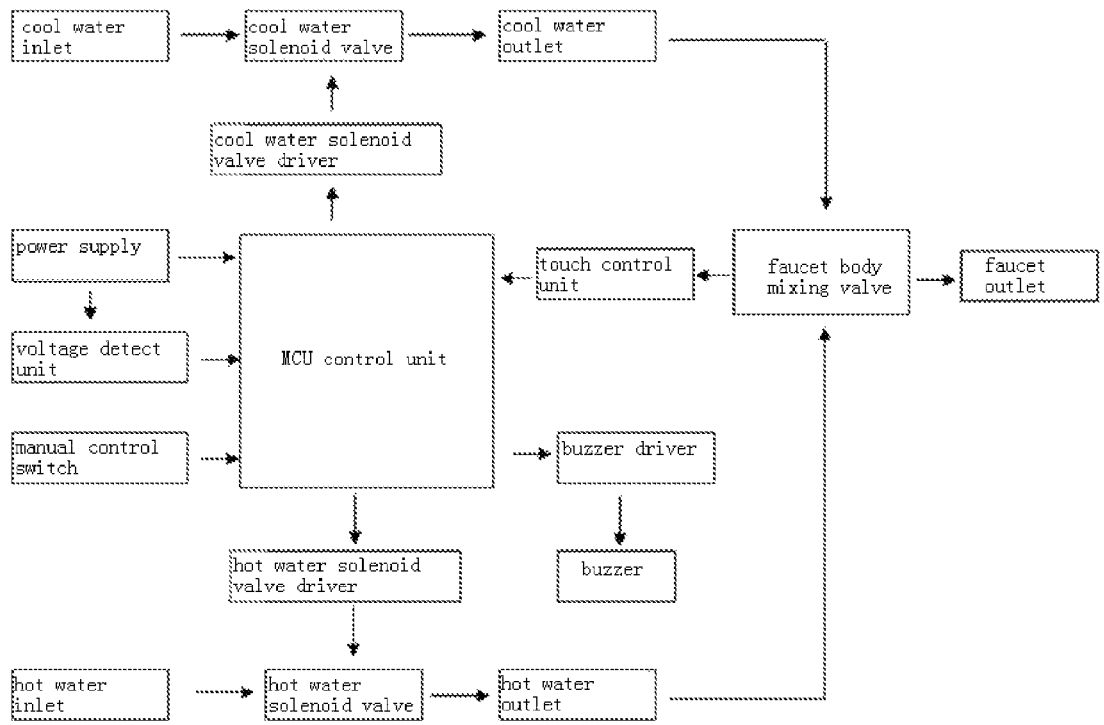
FIG. 3 is a block diagram showing the whole function of a switch assembly of the present invention.
Figure 5:
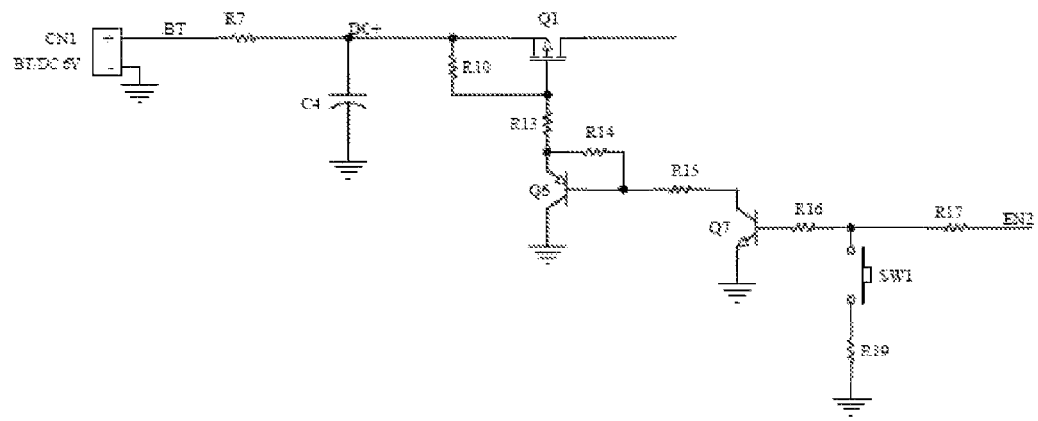
FIG. 5 is a schematic circuit diagram showing a power input section for a control circuit board inside the control box of the present invention.
Figure 6:
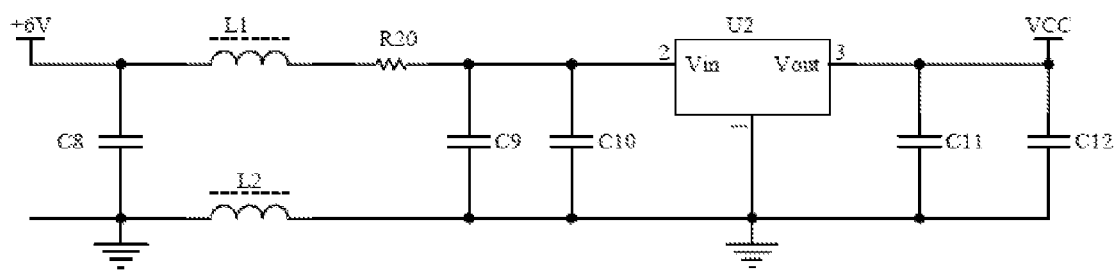
FIG. 6 is a schematic circuit diagram showing a power regulator section for powering each chip of the control circuit board inside the control box of the present invention.

FIG. 3 shows the operating procedure of the switch assembly of the present invention which has been installed to the faucet. Upon being energized, the buzzer beeps. Then the whole system enters a stand-by state. The circuit for the power input section of the whole system is shown in FIG. 5. SW1 is a reset switch, which, when being pressed, realizes the function of automatically power off and re-energizing to reset.

Figure 8:
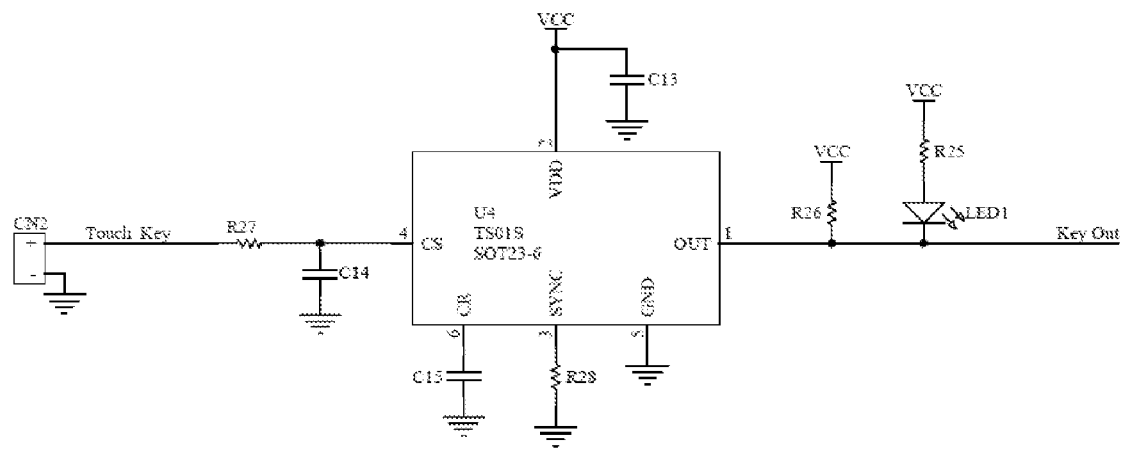
FIG. 8 is a schematic circuit diagram showing a touch control section for the control circuit board inside the control box of the present invention.

The touch control function is explained. As shown in FIG. 8, CN2 is connected to a metal portion of the faucet body, e.g. to the faucet spout. However, the touch effective area is not limited to the faucet tubing, but can comprise a metal portion which is connected with the faucet body. When the hand touches any portion of metal for the faucet, a weak touch signal (current signal) is delivered to a touch control chip U4 through a resistor R27. The touch signal is amplified by the touch control chip U4, and output from the first pin of U4 to the MCU for controlling. When there is a touch and the touch is effective, a touch control indicator LED1 is lighted up in green. The lighting time of LED1 is synchronized with the touch duration, which can be used to detect whether the touch signal is normal. When there is a touch and the touch is effective, the buzzer also beeps.

Figure 9:
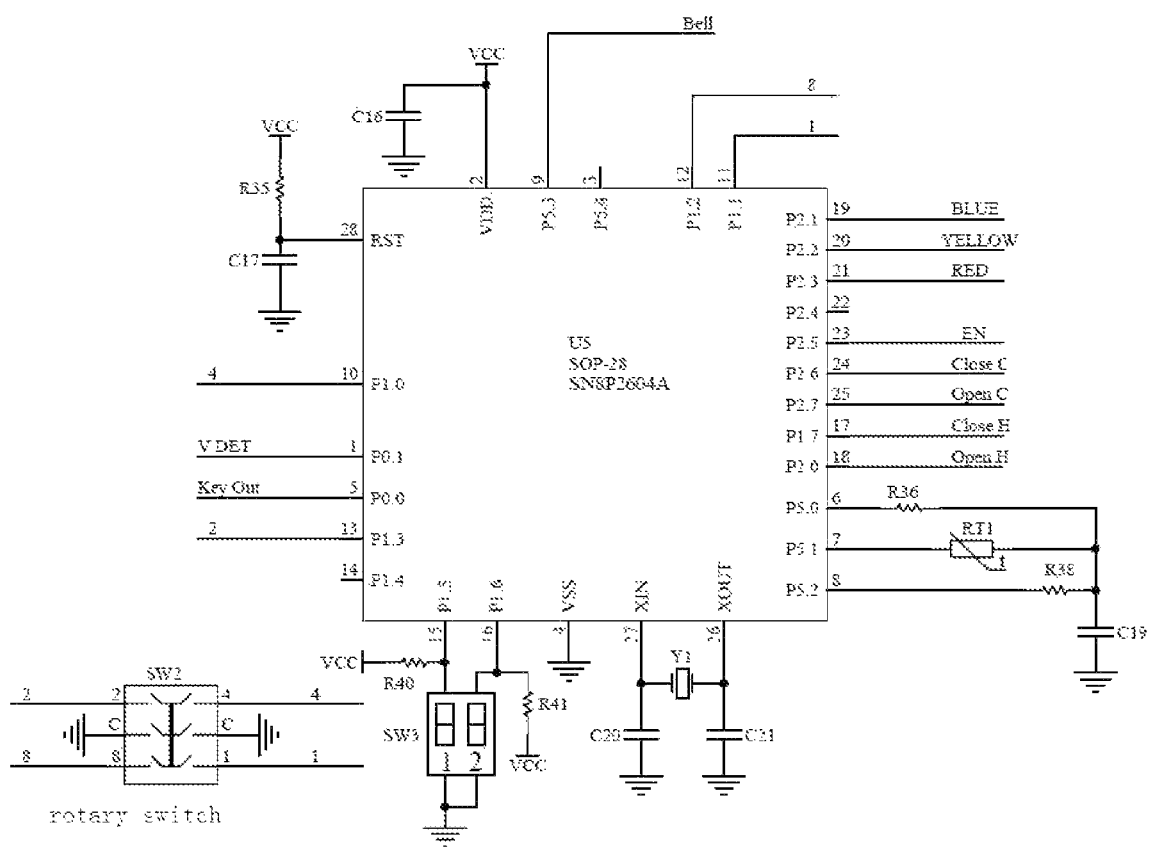
FIG. 9 is a schematic circuit diagram showing a control section of a MCU for the control circuit board inside the control box of the present invention.
Figure 10:
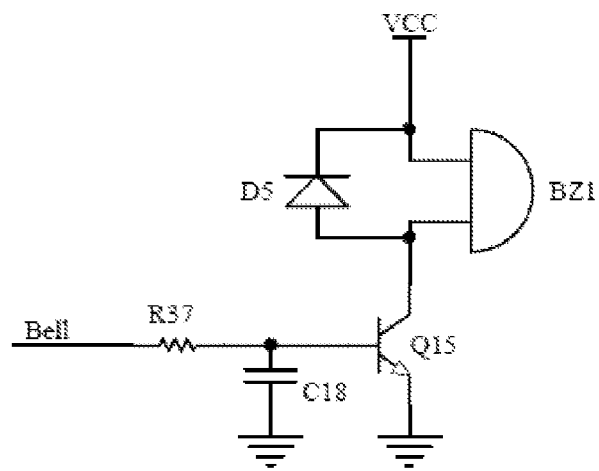
FIG. 10 is a schematic circuit diagram showing a driver section of a buzzer for the control circuit board inside the control box of the present invention.

The MCU control module is shown in FIG. 9. U5 is a MCU from SONIX (model: SN8P2604A). Y1 is a 4 MHz crystal oscillator, and provides a clock source for the MCU to operate stably. SW2 is a time delay select switch, and SW3 is a function select switch.

The time delay select switch is explained. SW2 is a rotary switch for selecting the time delay. When SW2 is set to level 0, the function of closing water is controlled manually. When SW2 is set to level 1, an automatic time delay of 10 seconds is selected. When SW2 is set to level 2, an automatic time delay of 20 seconds is selected. When SW2 is set to level 3, an automatic time delay of 30 seconds is selected. When SW2 is set to level 4, an automatic time delay of 40 seconds is selected. When SW2 is set to level 5, an automatic time delay of 50 seconds is selected. When SW2 is set to level 6, an automatic time delay of 60 seconds is selected. When SW2 is set to level 7, an automatic time delay of 120 seconds is selected. When SW2 is set to level 8, an automatic time delay of 180 seconds is selected. When SW2 is set to level 9, an automatic time delay of 300 seconds is selected.

The function select switch is explained. As shown in FIG. 9, SW3 is the function select switch. The first group performs the function of cold water only or temperature adjusting/selecting (when dialed upward, cold water only; when dialed downward, adjusting temperature for mixing water), and the second group performs the function of directly closing the solenoid valve or closing the solenoid valve via a touch (when dialed upward, directly closing; when dialed downward, closing via a touch).

Figure 7:
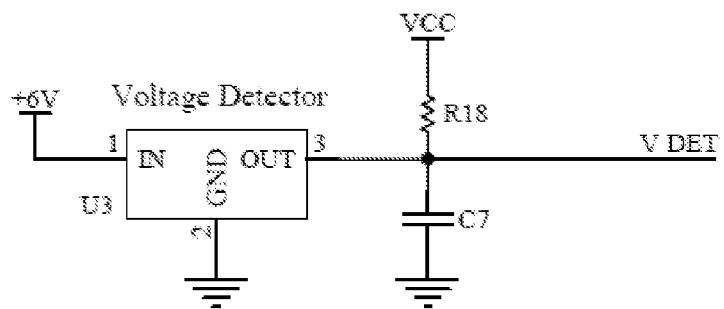
FIG. 7 is a schematic circuit diagram showing a voltage detection section for the control circuit board inside the control box of the present invention.

The function of the voltage detect module is to detect the voltage of battery, as shown in FIG. 7. When the rated voltage is 6V, and the input voltage is lower than 3.9V, the voltage detect module outputs a low level. When the battery is exhausted, the MCU control module outputs a solenoid valve open instruction, so that both the cold water solenoid valve and the hot water solenoid valve operate in the opened state.

Figure 11:
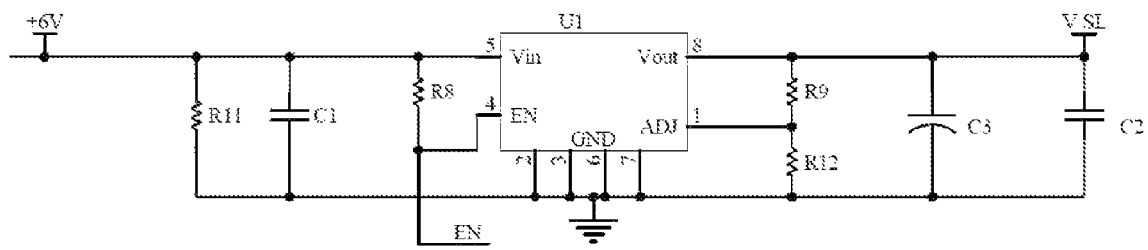
FIG. 11 is a schematic circuit diagram showing a power regulator section of a solenoid valve for the control circuit board inside the control box of the present invention.
Figure 12:
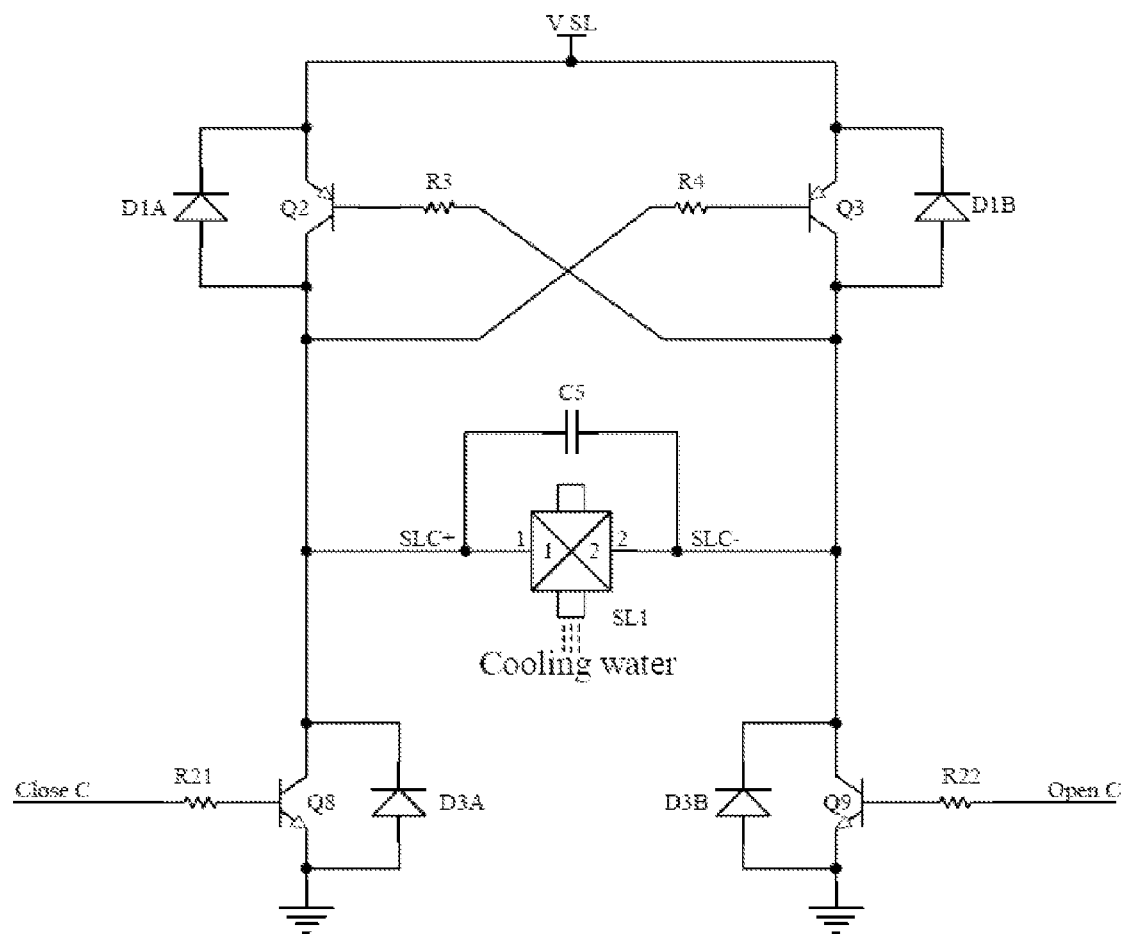
FIG. 12 is a schematic circuit diagram showing a driver section of a cold water solenoid valve for the control circuit board inside the control box of the present invention.

The cold water solenoid valve driver circuit is shown in FIG. 12. When the "open C" end inputs a positive pulse, the solenoid valve is opened. When the "close C" end inputs a positive pulse, the solenoid valve is closed. The power of the solenoid valve driver circuit is provided by a voltage regulator chip, as shown in FIG. 11. The input 6V voltage is regulated by the voltage regulator chip U1 to output a stable voltage for operating the solenoid valve and driver circuit.

Figure 13:
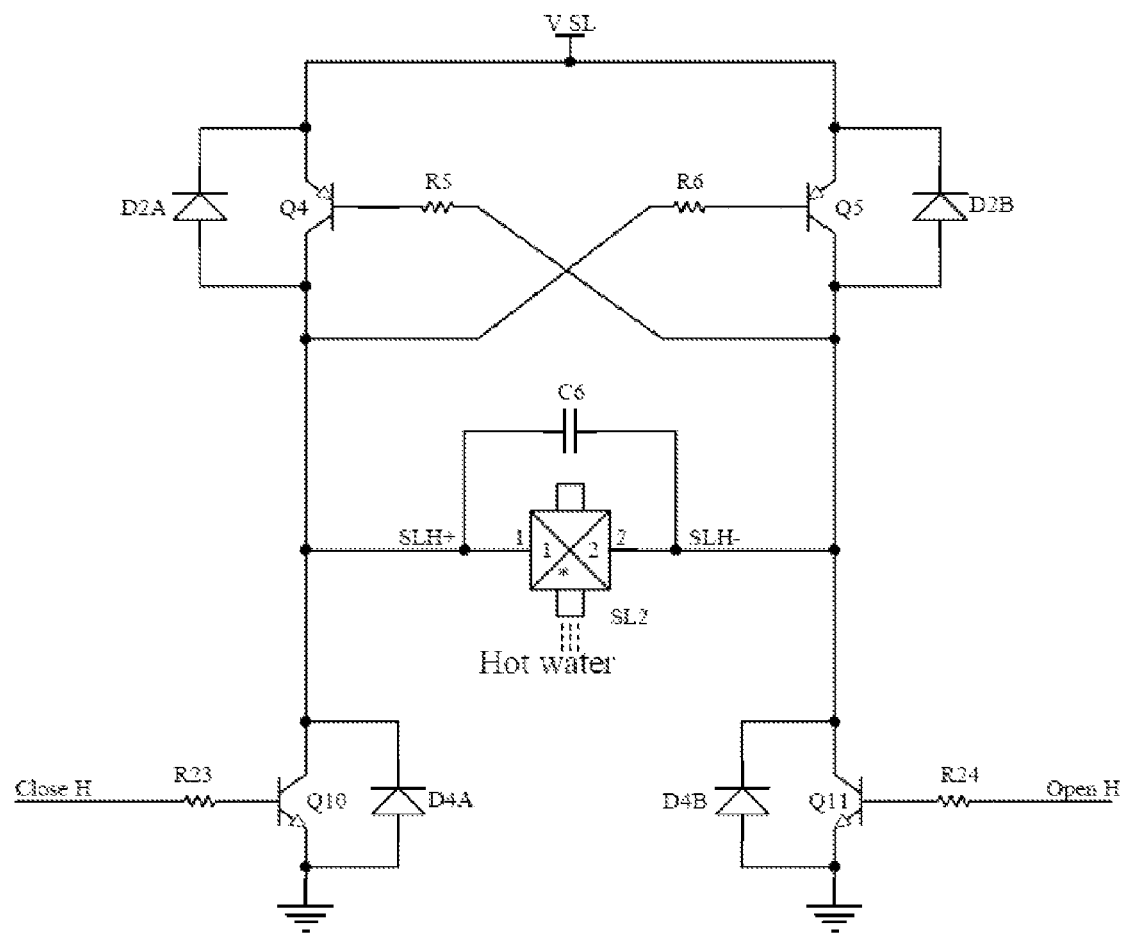
FIG. 13 is a schematic circuit diagram showing a driver section of a hot water solenoid valve for the control circuit board inside the control box of the present invention.

The hot water solenoid valve driver circuit is shown in FIG. 13. When the "open H" end inputs a positive pulse, the solenoid valve is opened. When the "close H" end inputs a positive pulse, the solenoid valve is closed. The power of the solenoid valve driver circuit is provided by a voltage regulator chip, as shown in FIG. 11. The input 6V voltage is regulated by the voltage regulator chip U1 to output a stable voltage for operating the solenoid valve and driver circuit.

While there has been illustrated and described what is at present considered to be preferred embodiments of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A universal capacitance-type touch inductive switch assembly for a faucet, characterized in that the switch assembly comprises:

an induction component, which is formed by a conductive metallic material;

a control circuit board, which is provided with a capacitance-type touch unit, wherein touch electrodes of said capacitance-type touch unit are connected with said induction component through a touch circuit;

a cold water solenoid valve and a hot water solenoid valve, which are arranged in a cold water feed line and a hot water feed line respectively, wherein said cold water feed line and hot water feed line are both arranged upstream with respect to a water mixing valve in the water supply line of the faucet, and said control circuit board controls opening and closing of said cold water solenoid valve and said hot water solenoid valve according to a touch signal from the capacitance-type touch unit; and a power supply module, which supplies power to said control circuit board and said solenoid valves, in case said hot water solenoid valve and said cold water solenoid valve are both closed, a touch is an effective touch if its duration exceeds a time delay which is selected by a time delay select unit, and if a continuous time elapses after the end of the effective touch during which there is no effective touch, said control circuit board opens both the hot water solenoid valve and cold water solenoid valve, if a second effective touch occurs in a continuous time after a first effective touch, then these two effective touches form a continuous effective touch, and if the times of continuous effective touch are two or more, said control circuit board closes the hot water solenoid valve and only opens the cold water solenoid valve.

* * * * *